US012472548B2

(12) United States Patent
Nakagawa et al.

(10) Patent No.: US 12,472,548 B2
(45) Date of Patent: Nov. 18, 2025

(54) PRESSED COMPONENT MANUFACTURING METHOD, DIE DESIGNING METHOD, DIE SHAPE DESIGNING DEVICE, AND DIE (71) Applicant: JFE STEEL CORPORATION, Tokyo (JP)

(72) Inventors: Kinya Nakagawa, Tokyo (JP); Toyohisa Shinmiya, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 391 days.

(21) Appl. No.: 18/022,945

(22) PCT Filed: Jul. 15, 2021

(86) PCT No.: PCT/JP2021/026673
§ 371 (c)(1),
(2) Date: Feb. 23, 2023

(87) PCT Pub. No.: WO2022/049904
PCT Pub. Date: Mar. 10, 2022

(65) Prior Publication Data
US 2023/0311186 A1 Oct. 5, 2023

(30) Foreign Application Priority Data
Sep. 2, 2020 (JP) .................. 2020-147655

(51) Int. Cl.
*B21D 22/26* (2006.01)
*B21C 51/00* (2006.01)
*B23P 15/24* (2006.01)

(52) U.S. Cl.
CPC .............. *B21D 22/26* (2013.01); *B21C 51/00* (2013.01); *B23P 15/24* (2013.01)

(58) Field of Classification Search
CPC .. G06F 2113/24; G06F 2119/18; G06F 30/17; G06F 17/40; B21D 22/26;
(Continued)

(56) References Cited

U.S. PATENT DOCUMENTS 8,140,306 B2   3/2012  Kubli et al.
8,287,268 B1 * 10/2012  Thomas .................. B29C 48/92
                                              425/208
(Continued)

FOREIGN PATENT DOCUMENTS

JP    2007-326112 A   12/2007
JP       5188803 B2    4/2013
(Continued)

OTHER PUBLICATIONS

Feb. 12, 2024 Extended Search Report issued in European Patent Application No. 21863962.3.
(Continued)

*Primary Examiner* — Nicholas Klicos
(74) *Attorney, Agent, or Firm* — Oliff PLC (57) ABSTRACT A pressed component manufacturing method wherein, in press forming a metal sheet into a final component shape through two or more press steps, the inflow amount of the required material is determined based on the increase in the cross-sectional line length of the shape with respect to the line length before forming when the metal sheet is press formed by a single press step, the determined amount is distributed to each step, and a preformed shape after press forming based on the distributed inflow amount. As the cross section, a line orthogonal to a direction in which the material flows when the metal sheet is drawn is set, and a plurality of cross sections is set which is individually cut by each of (Continued)

planes orthogonal to the line and extending in a direction along the sheet thickness direction of the metal sheet before forming.

23 Claims, 5 Drawing Sheets

(58) Field of Classification Search
CPC ...... B21D 43/28; B21D 24/005; B21D 22/20; B23P 15/24; B21C 51/00
See application file for complete search history.

(56) References Cited

U.S. PATENT DOCUMENTS

| | | |
|---|---|---|
| 10,730,090 B2 | 8/2020 | Nakagawa et al. |
| 11,270,047 B2 | 3/2022 | Tanaka et al. |
| 2008/0243442 A1 | 10/2008 | Kubli et al. |
| 2013/0037555 A1* | 2/2013 | Monro ................... B21D 22/30 220/608 |
| 2015/0209994 A1* | 7/2015 | Gubenko ................ B29C 48/07 425/461 |
| 2016/0160311 A1* | 6/2016 | Nakagawa ............... C21D 9/50 138/171 |
| 2016/0257807 A1* | 9/2016 | Tadokoro ................ C08L 23/06 |
| 2017/0052531 A1* | 2/2017 | Minardi ................ B29C 64/393 |
| 2018/0093315 A1* | 4/2018 | Kubo .................... B21D 22/22 |
| 2018/0185899 A1* | 7/2018 | Saito ...................... B21D 24/04 |
| 2019/0160510 A1* | 5/2019 | Tanaka ................... B21D 53/88 |
| 2020/0311325 A1 | 10/2020 | Tanaka et al. |

FOREIGN PATENT DOCUMENTS

| | | |
|---|---|---|
| JP | 5867657 B2 | 2/2016 |
| JP | 5911466 B2 | 4/2016 |
| JP | 2021-071738 A | 5/2021 |
| WO | 2018/123989 A1 | 7/2018 |

OTHER PUBLICATIONS

Sep. 7, 2021 International Search Report issued in International Patent Application No. PCT/JP2021/026673.

Mar. 7, 2023 International Preliminary Report on Patentability issued in International Patent Application No. PCT/JP2021/026673.

* cited by examiner

PRESSED COMPONENT MANUFACTURING METHOD, DIE DESIGNING METHOD, DIE SHAPE DESIGNING DEVICE, AND DIE

TECHNICAL FIELD

The present invention relates to a technology for manufacturing a target pressed component by a plurality of press steps including drawing.

BACKGROUND ART

From various viewpoints, such as weight reduction, aerodynamic performance, design, and collision safety, the performance required in automobile components has been increasing more and more in recent years. Therefore, there is an increasing demand for the manufacture of component shapes that are difficult to form using common pressing methods. Further, in view of a problem of vehicle prices and problems of resource saving and $CO_2$ reduction, there is a demand for a reduction in materials used in the manufacture of products, i.e., an increase in material yield.

As a method for improving the formability in press forming, methods described in PTL 1 and PTL 2 are mentioned, for example. PTL 1 discloses a technology of improving formability by optimizing the die shape in each step in a plurality of stretch forming steps. PTL 2 makes it possible to drive a local area of a press die as an individual movable punch. PTL 2 discloses a method for preventing forming defects by leading a blank into the die in advance, and then performing forming using the movable punch.

CITATION LIST

Patent Literatures

PTL 1: JP 5867657 B
PTL 2: JP 2007-326112 A

SUMMARY OF INVENTION

Technical Problem

The method described in PTL 1 is directed to stretch forming or drawing-stretch forming with a small inflow amount. However, the method described in PTL 1 is difficult to apply to a component shape that cannot be formed without being greatly drawn. Specifically, the method described in PTL 1 is difficult to apply when forming is performed such that an increase in the line length of the final shape with respect to that in the initial state far exceeds the uniform elongation.

In the method described in PTL 2, the forming is performed while pressurizing a site led by the movable punch in advance. Therefore, material movement or deformation does not occur any more in a pressurized site, and thus the effect is limited. PTL 2 does not disclose a detailed die designing method or the setting range of the movable punch, for example.

The present invention has been made in view of the above-described respects. It is an object of the present invention to provide a pressed component manufacturing method and a die designing method applicable even when a pressed component shape that cannot be formed without being greatly drawn is manufactured.

Solution to Problem

To solve the problem, one aspect of the present invention is a pressed component manufacturing method for press forming a metal sheet into a final component shape through a plurality of press steps, in which, when one step is selected from the plurality of press steps and set as a selection step, a component shape obtained in the selection step is set as a selected component shape, one press step selected from the plurality of press steps and carried out before the selection step is set as a reference step, and the shape of the metal sheet before press forming in the reference step is set as a reference shape, the press steps from the reference step to the selection step include a press step having drawing, and the pressed component manufacturing method includes: a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along the sheet thickness direction of the metal sheet before forming; an inflow amount calculation step of individually determining the inflow amount of the material required for forming the reference shape into the selected component shape based on a cross-sectional line length of the selected component shape cut by the cross section, the cross-sectional line length in the reference shape cut by the same cross section as the cross section, and the uniform elongation of the material of the metal sheet for each cross section; an inflow amount distribution step of distributing the determined inflow amount to each step from the reference step to the selection step for each cross section; a cross-sectional line length calculation step of individually calculating the cross-sectional line length for each cross section in each step from the reference step to a step one before the selection step based on the distributed inflow amount; and a shape determination step of determining a preformed shape after the press forming in each step from the reference step to the step one before the selection step based on the calculated cross-sectional line length.

An aspect of the present invention is a die designing method, the die being used in press forming a metal sheet into a final component shape through a plurality of press steps, in which, when one step is selected from the plurality of press steps and set as a selection step, a component shape obtained in the selection step is set as a selected component shape, one press step selected from the plurality of press steps and carried out before the selection step is set as a reference step, and the shape of the metal sheet before press forming in the reference step is set as a reference shape, the press steps from the reference step to the selection step include a press step having drawing, and the die designing method includes: a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along the sheet thickness direction of the metal sheet before forming; an inflow amount calculation step of individually determining the inflow amount of the material required for forming the reference shape into the selected component shape based on a cross-sectional line length of the selected component shape cut by the cross section, the cross-sectional line length in the reference shape cut by the same cross section as the cross section, and the uniform elongation of the material of the metal sheet for each cross section; an inflow amount distribution step of distributing the determined inflow amount to each step from the reference step to the selection step for each cross section; a cross-sectional line length calculation step of individually calculating the cross-sectional line length for each cross section in each step from the reference step to a step one before the selection step based on the distributed inflow amount; and a shape determination step of determining a die shape used in each step from the reference step to the step one before the selection step based on the calculated cross-sectional line length.

An aspect of the present invention is a die shape designing device for, in press forming a metal sheet into a final component shape through a plurality of press steps, determining a die shape of a die used in each step excluding a final press step, in which, when one step is selected from the plurality of press steps and set as a selection step, a component shape obtained in the selection step is set as a selected component shape, one press step selected from the plurality of press steps and carried out before the selection step is set as a reference step, and the shape of the metal sheet before press forming in the reference step is set as a reference shape, the press steps from the reference step to the selection step include a press step having drawing, and the die shape designing device includes: a cross section setting unit configured to set a line orthogonal to, in plan view, a direction in which a material flows when the metal sheet of the reference shape is drawn into the selected component shape by a single step, and set a plurality of cross sections individually cut by each of planes orthogonal to the line in plan view and extending in a direction along the sheet thickness direction of the metal sheet before forming; an inflow amount calculation unit configured to individually determine the inflow amount of the material required for forming the reference shape into the selected component shape based on a cross-sectional line length of the selected component shape cut by the cross section, the cross-sectional line length in the reference shape cut by the same cross section as the cross section, and the uniform elongation of the material of the metal sheet for each cross section; an inflow amount distribution unit configured to distribute the determined inflow amount to each step from the reference step to the selection step for each cross section; a cross-sectional line length calculation unit configured to individually calculate the cross-sectional line length for each cross section in each step from the reference step to a step one before the selection step based on the distributed inflow amount; and a shape determination unit configured to determine the die shape in each step from the reference step to the step one before the selection step based on the calculated cross-sectional line length.

Advantageous Effects of Invention

According to the aspects of the present invention, even when a pressed component shape that cannot be formed without being greatly drawn, a pressed component can be more reliably manufactured. The pressed component shape that cannot be formed without being greatly drawn is, for example, a pressed component shape in which the cross section has a steep projection shape.

More specifically, according to the aspects of the present invention, a material can be caused to flow into a product without excess or deficiency after obtaining a sufficient elongation of the material through a plurality of steps of pressing. Therefore, the aspects of the present invention make it possible to maximally improve the material yield while suppressing cracks and wrinkles in the product.

DESCRIPTION OF EMBODIMENTS

Next, embodiments of the present invention will be described with reference to the drawings.

A pressed component manufacturing method of this embodiment is a pressed component manufacturing method for press forming a metal sheet into a final component shape through two or more press steps. The two or more press steps include a press step carried out by drawing.

For example, the pressed component manufacturing method of this embodiment includes press forming a metal sheet into a final component shape (target component shape) through two or more press steps including a press step carried out by drawing. In the manufacture of the pressed component, an increase in the line length of the cross-sectional component shape in the final component shape with respect to the line length of the metal sheet before forming in the press forming of the metal sheet into the final component shape by a single press step is determined. Based on the increase in the line length, the inflow amount of a material required for forming the metal sheet into the final component shape is determined. The determined inflow amount of the material is distributed to each step, and a preformed shape after press forming in the steps other than a final press step is determined.

A die in each step for realizing the determined preformed shape is designed. By carrying out the press forming in each step using the designed die, a product (pressed component) of the target final component shape is manufactured.

Next, a method for determining each preformed shape after the press forming and a method for designing the die in each step for realizing the determined preformed shape in each step for forming the product of the final component shape (pressed component) are described.

Figure 1:
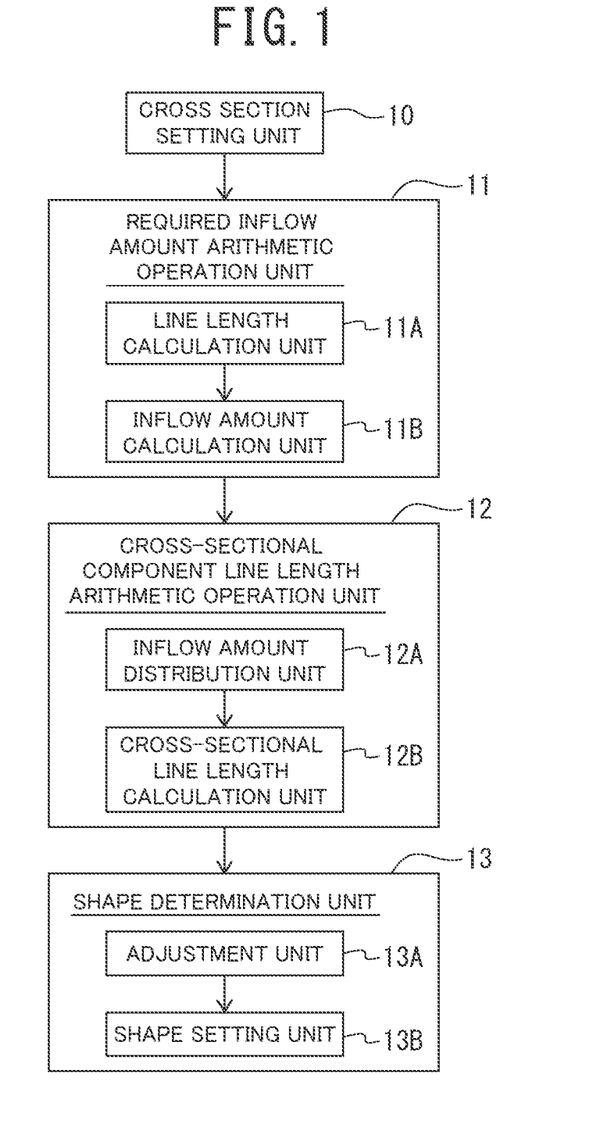
FIG. 1 is a view for explaining shape determination processing according to an embodiment based on the present invention.

This embodiment determines the preformed shape in each step, and designs the die in each step using a die shape designing device having functional blocks 10 to 13 as illustrated in FIG. 1.

(Die Shape Designing Device)

The die shape designing device is provided in the form of a program carried out on a computer and includes a cross section setting unit 10 constituting a cross section setting step, a required inflow amount arithmetic operation unit 11 constituting a required inflow amount arithmetic operation step, a cross-sectional component line length arithmetic operation unit 12, and a shape determination unit 13 constituting a shape determination step as illustrated in FIG. 1, and processing is performed in this order.

Herein, one step is selected from a plurality of press steps, and the selected step is described as a selection step. The component shape obtained in the selection step is described as a selected component shape 1. One press step selected from the plurality of press steps and carried out before the selection step is described as a reference step. The shape of the metal sheet before press forming in the reference step is described as a reference shape 6.

Then, the press steps from the reference step to the selection step are set to include a press step having drawing.

This embodiment describes a case where the selection step is set as the final press step as an example. In this case, the selected component shape 1 is the final component shape. Further, this embodiment describes a case where the reference step is set as a first press step as an example. In this case, the reference shape 6 is a blank shape before press forming, such as a flat sheet (see FIG. 5).

Figure 2:
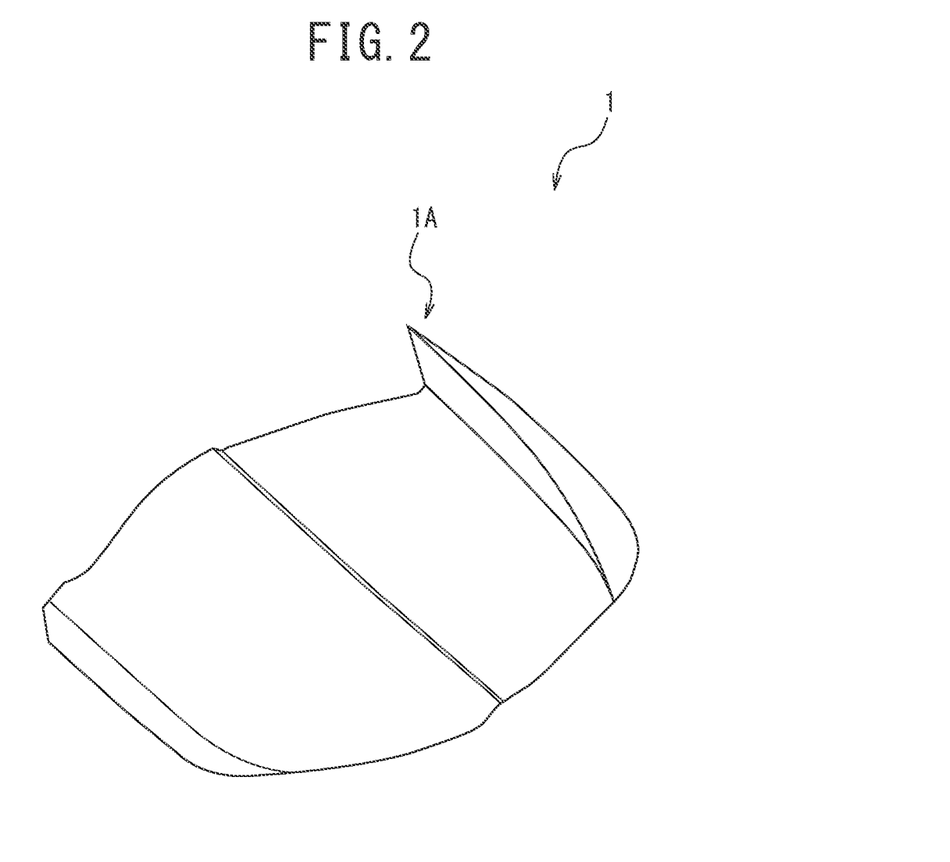
FIG. 2 is a view illustrating an example of a selected component shape (final component shape) according to the embodiment based on the present invention.

This embodiment describes a case where the selected component shape 1 has one projection portion having a steeply rising cross section in a part as illustrated in FIG. 2 as an example. Components having one projection portion are, for example, automobile panel members having a spoiler portion. More specifically, in the selected component shape of this embodiment, the sharply rising projection portion extends in a predetermined direction (extending direction of the one projection portion). The selected component shape 1 has a drawn area 1A in which a material flows into a position where the projection portion is formed from a direction crossing the predetermined direction in plan view when the metal sheet is drawn into the selected component shape by a single step.

The shape of such a projection portion having the steep cross section needs to be formed deeply and sharply in the projecting direction. Therefore, when the projection portion is formed by drawing, the projection portion is a difficult-to-form place.

(Cross Section Setting Unit 10)

The cross section setting unit 10 sets a plurality of cross sections by which the selected component shape 1 is cut in a direction along the sheet thickness direction of the metal sheet before forming. The direction along the sheet thickness direction is a press direction, for example.

The cross section setting unit 10 of this embodiment sets a line orthogonal to, in plan view, a direction in which the material flows when the metal sheet of the reference shape 6 is drawn into the selected component shape by a single step. The cross section setting unit 10 of this embodiment, assuming planes orthogonal to the set line in plan view and extending in the direction along the sheet thickness direction of the metal sheet before forming, sets the plurality of cross sections individually cut by the planes.

Herein, the direction in which the material flows refers to a representative material flow direction and refers to a direction in which the material of an amount equal to or larger than a predetermined amount flows or an approximate moving direction of the material, for example. The "line orthogonal to, in plan view, a direction in which the material flows" is set at a position (area) where the movement amount of the material is the largest or in the vicinity thereof, for example.

Figure 3:
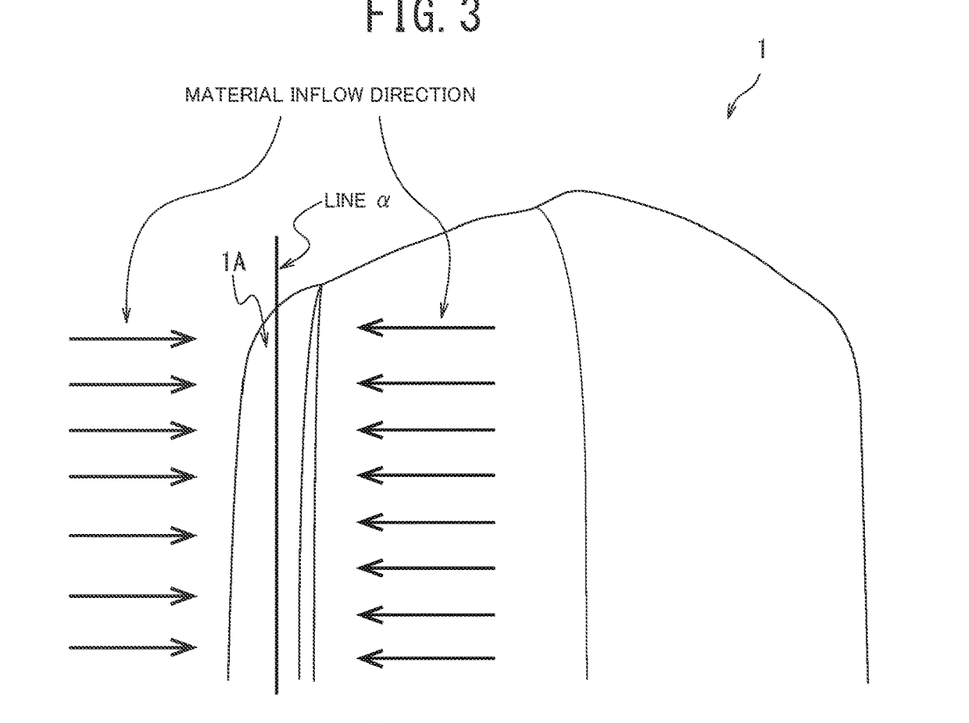
FIG. 3 is a plan view illustrating an example of setting lines defining a plurality of cross sections.

In the selected component shape 1 as illustrated in FIG. 2, the material flows toward an area formed into the projection portion from a direction orthogonal or substantially orthogonal to the extending direction of the projection portion of the drawn area 1A in plan view as illustrated in FIG. 3. In the drawn area 1A, a portion of the set line is set in a straight line shape along the extending direction of the projection portion in plan view as illustrated in FIG. 3. The main directions in which the material flows are arranged along the extending direction of the projection portion and are set in the same direction.

In FIG. 3, lines indicated by the arrows indicate the directions in which the material flows. A line α may be a curved line. When the one projection portion extends in a curved line shape, the line α is also formed by the curve along the curved line shape.

Figure 4:
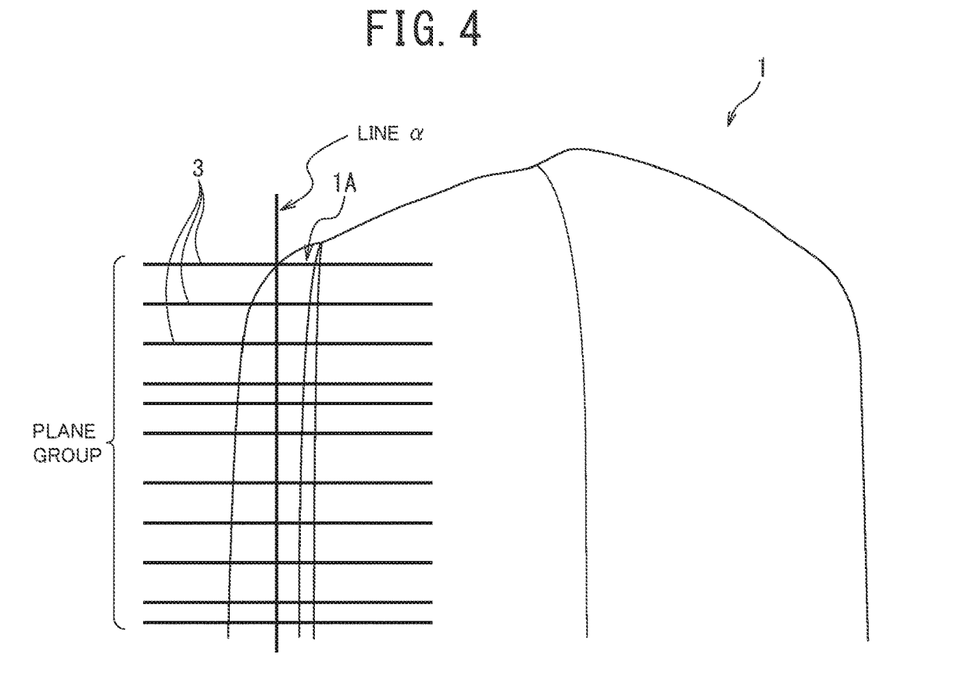
FIG. 4 is a view illustrating an example of setting a plurality of cross sections.

Then, as illustrated in FIG. 4, the cross section setting unit 10, assuming n planes orthogonal to, in plan view, the line α set in the drawn area 1A and extending in the direction along the sheet thickness direction of the metal sheet before forming, sets a plurality of cross sections individually cut by the n planes. The cross sections are planes extending in the direction along the sheet thickness and different from each other.

This embodiment sets the line α as a straight line, and therefore the n planes are planes parallel to each other. More specifically, the plurality of cross sections each is a plane containing the line α. Therefore, the cross sections 3 are arranged along the extending direction of the line α as illustrated in FIG. 4. The distances between the cross sections 3 in plan view do not need to be set at equal intervals. For example, the cross section positions (planes) are set to pass through the vicinity of a place where the inflow amount of the material is large. The plane containing the line α refers to a plane passing through the line α.

By setting the plurality of cross sections as described above, the plane defining each cross section is set along the material flow direction. As a result, the flow amount of the material can be properly distributed.

Herein, this embodiment describes a case of setting the line α only in the drawn area 1A, which is a difficult-to-form place by drawing, and determining the preformed shape of the cross section in each step.

When there are two or more of the drawn areas 1A which are difficult-to-form places by drawing, the processing of this embodiment may be performed in each drawing. Alternatively, the processing of this embodiment for the plurality of drawn areas 1A may be carried out at once. The lines set in the drawn areas 1A do not necessarily have to be continuous.

Even when the projection portion does not have a shape extending in one predetermined direction, this embodiment is applicable. For example, when the steep projection portion has a circular shape in plan view, the material flows from the entire outer periphery toward the projection portion. In this case, by setting the line α to be orthogonal to the inflow, the line α is set as an endless annular line surrounding the projection portion, for example.

In this embodiment, the "in plan view" refers to a case of being viewed from the press direction or the sheet thickness direction of the metal sheet before forming.

<Example of Selected Component Shape 1>

Herein, an example of the selected component shape 1 having the shape as described above (see FIG. 2) imitates a back door of an automobile. It is generally difficult to deeply and sharply form a spoiler portion. When this shape is formed by drawing, a material inflow direction with respect to the spoiler portion is the direction illustrated in FIG. 3. Therefore, a direction approximately perpendicular to the material inflow direction and parallel to the z-axis is set as the line α (FIG. 3). Then, a group of n vertical planes orthogonal to the line α and extending in the sheet thickness direction is set (FIG. 4). The n cut cross sections of a target shape by the plane group are the desired component cross-sectional shapes. n may be an integer of 1 or more. As the number is larger, the inflow amount can be more precisely estimated and a die can be more precisely designed. Therefore, n is desirably set to 5≤n.

(Required Inflow Amount Arithmetic Operation Unit 11)

The required inflow amount arithmetic operation unit 11 individually determines, for each cross section, the inflow amount of the material required for forming the reference shape 6 into the selected component shape 1 based on the cross-sectional line length of the selected component shape 1 cut by the cross section, the cross-sectional line length in the reference shape 6 cut by the same cross section as the cross section, and the uniform elongation of the material of the metal sheet.

The required inflow amount arithmetic operation unit 11 includes a line length calculation unit 11A and an inflow amount calculation unit 11B.

Herein, in this specification, the number of the plurality of cross sections is defined as n and the subscript identifying each cross section is defined as i (1≤i≤n). The line length in the selected component shape 1 is defined as $L_i1$ and the line length in the reference shape 6 is defined as $L_i2$, which are cut by the same cross section for each cross section. The uniform elongation of the material is defined as El. The number of the press steps from the reference step to the selection step is defined as m. The subscript identifying the press step is defined as j (1≤j≤m).

<Line Length Calculation Unit 11A>

Figure 5:
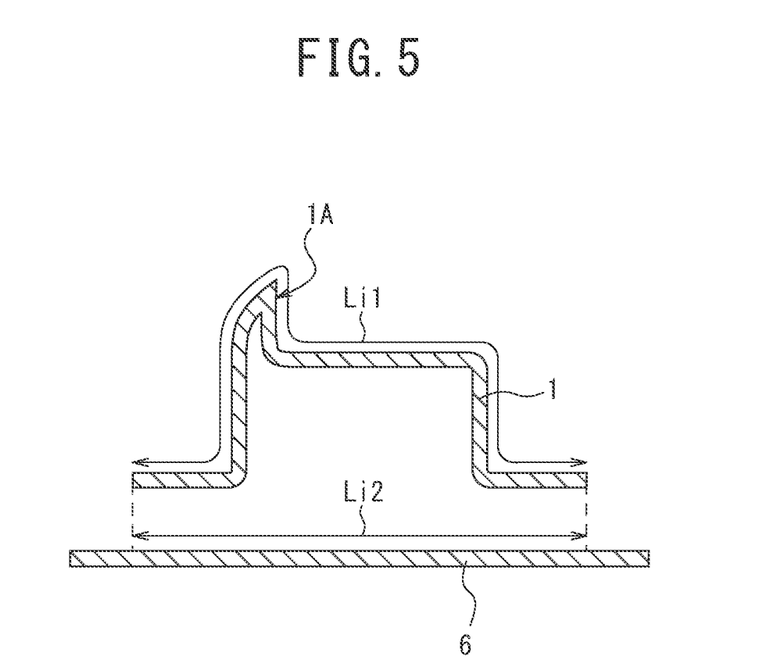
FIG. 5 is a view illustrating an example of the relationship between the selected component shape (final component shape) and a reference shape (blank shape)

The line length calculation unit 11A sets each component cross-sectional shape in which the selected component shape 1 is cut by each set cross section as $S_i$ (wherein 1≤i≤n). Then, the line length ($L_i1$) in the selected component shape 1 and the line length ($L_i2$) in the reference shape 6 in the same cross section are individually calculated. More specifically, the line length ($L_i1$) in the selected component shape 1 and the line length ($L_i2$) in the reference shape 6 (planar shape in this embodiment) when the cross section of the selected component shape 1 is projected in the press direction as illustrated in FIG. 5 are individually calculated for each cross section.

<Inflow Amount Calculation Unit 11B>

The inflow amount calculation unit 11B calculates the inflow amount ($L_i3$) required for forming the selected component shape 1 in each cross section from the uniform elongation (El) of the material of the metal sheet and the line length ($L_i1$) in the selected component shape 1 and the line length ($L_i2$) in the reference shape 6 calculated in the line length calculation step for each cross section.

In this embodiment, the inflow amount ($L_i3$) required for the forming is calculated from Expression (1).

$$L_i3 = L_i1 - L_i2 - aEl \quad (1)$$

In Expression (1), 0<a<1 is established.

Herein, $L_i1$ is the cross-sectional line length of the i-th cross section in the selected component shape 1 (final component shape in this embodiment). $L_i2$ is the cross-sectional line length of the i-th cross section in the reference shape 6 (initial state in this embodiment). Therefore, to obtain the cross-sectional line length of the final state from the initial state, it is necessary to extend (increase) the line length by the length of ($L_i1-L_i2$). This extension length needs to be compensated by the sum of the elongation amount of the material (aEl) and the inflow amount ($L_i3$).

The elongation amount of the material is limited by the uniform elongation (El) of the material, and it is necessary to cause the material to flow in the amount that cannot be compensated by the extension amount.

The coefficient a in Expression (1) is a constant setting the elongation degree of the material with respect to the limit of the uniform elongation of the material. A case of a=0 means that the material is not elongated at all, and the insufficient line length is all compensated by the inflow. A case of a=1 means that the material is elongated to the limit in all of the design areas, and the insufficient line length is compensated by the inflow. Theoretically, a can take any real number of 0 or more and 1 or less. However, the case of a=0 assumes that the material is not elongated at all, and thus there is no meaning in using the method of the present invention. In the case of a=1, it is necessary to elongate the material to the limit in all of the design areas, but such forming is extremely difficult by common press forming. Therefore, 0 and 1 are excluded from the range of a. A desirable range of a is 0.2≤a≤0.8.

(Cross Sectional Component Line Length Arithmetic Operation Unit 12)

The cross-sectional component line length arithmetic operation unit 12 distributes the determined inflow amount to each step from the reference step to the selection step for each cross section. Then, the cross-sectional line length in each step from the reference step to a step one before the selection step is arithmetically operated based on the distributed inflow amount.

The cross-sectional component line length arithmetic operation unit 12 includes an inflow amount distribution unit 12A constituting an inflow amount distribution step and a cross-sectional line length calculation unit 12B constituting the cross-sectional line length calculation step.

<Inflow Amount Distribution Unit 12A>

The inflow amount distribution unit 12A carries out the processing of distributing the determined inflow amount to each step from the reference step to the selection step for each cross section.

The inflow amount $L_i3$ obtained in the required inflow amount arithmetic operation unit 11 may be the sum of the inflow amounts of all of the steps from the reference step to the selection step. This makes it possible to distribute the inflow amount in each step.

The inflow amount distribution unit 12A distributes the inflow amount of the k-th step in the i-th cross section as $b_k \cdot L_i3$ for each cross section.

Herein, k is the number of the step. The reference step is k=1 and the selection step is k=m. i is the number of each cross section. The coefficient $b_k$ sets the inflow degree of the material in the k-th step among all of m times of press steps. $\Sigma_{k=1}^{m}(b_k \cdot L_i3) = L_i3$ is established, and therefore the setting is performed to satisfy $\Sigma_{k=1}^{m}(b_k) = 1$. $0 \leq b_k \leq 1$ is set.

For example, when the forming is performed by two steps (m=2), the inflow amount in the first step is set to $b_1 \times L_i3$ and the inflow amount in the second step is set to $b_2 \times L_i3$. $b_1 + b_2 = 1$ is established. At this time, a case of $b_1 = 0$ means that the material is not caused to flow in the first step. A case of $b_2 = 0$ similarly means that the material is not caused to flow in the second step.

In general, it is desirable in the final press step that the inflow is suppressed from the viewpoint of the appearance, the component shape accuracy, and the like and tension is given to the component. Therefore $b_m < 1$ is desirably set. On the other hand, $b_m$ is made as small as possible in the previous forming. Therefore, $b_k > 0$ (k<m) is desirably established.

<Cross-Sectional Line Length Calculation Unit 12B>

The cross-sectional line length calculation unit 12B calculates the cross-sectional line length for each cross section in each step from the reference step to the step one before the selection step based on the distributed inflow amount.

In each cross section, the cross-sectional line length ($L_i4$) in each step is the sum of the sum of the materials allowed to inflow up to the step and the line length in the initial state. Therefore, it is represented by Expression (2).

The cross-sectional line length calculation unit 12B determines the cross-sectional line length ($L_i4$) in the j-th step in each cross section by Expression (2). j takes a value of $1 \leq j \leq m-1$. The cross-sectional line length in the j-th step does not need to determine because it is the cross section of the selected component shape 1.

$$L_i 4 = L_i 2 + (b_1 + \ldots + b_j) \cdot L_i 3 = L_i 2 + \sum_{k=1}^{j}(b_k \cdot L_i 3) \qquad (2)$$

(Shape Determination Unit 13)

The shape determination unit 13 determines the preformed shape after the press forming in each step from the reference step to the step one before the selection step based on the calculated cross-sectional line length. Then, the die shape forming the determined preformed shape is determined.

The shape determination unit 13 of this embodiment includes an adjustment unit 13A constituting an adjustment step and a shape setting unit 13B. The adjustment unit 13A may not be provided.

<Adjustment Unit 13A>

The adjustment unit 13A adjusts the length of the cross-sectional line length for each cross section on the condition that the total sum of the cross-sectional line length for each cross section calculated by the cross-sectional line length calculation unit 12B is not changed. This adjustment is carried out for each step from the reference step to the step one before the selection step. The adjustment unit 13A adjusts the cross-sectional line length based on a line length difference between adjacent cross sections as viewed from the press direction, for example. For example, the adjustment is performed such that the line length difference between the adjacent cross sections is small.

The adjustment unit 13A of this embodiment adjusts the distribution of cross-sectional line lengths $L_14$ to $L_n4$ based on the condition that the total sum of the cross-sectional line lengths $L_14$ to $L_n4$ in a target step is not changed and calculates cross-sectional line lengths $L_15$ to $L_n5$ after the adjustment.

Herein, the cross-sectional line length calculation unit 12B calculates the cross-sectional line length $L_i4$ for each cross section, which defines the preformed shape in each press step. There is sometimes a cross section where the cross-sectional line length $L_i4$, among the cross-sectional line lengths, in a certain step is extremely longer or shorter than a cross-sectional line length $L_{(i-1)}4$ in a step one before the certain step and a cross-sectional line length $L_{(i+1)}4$ in a step one after the certain step. This case means that the component shape is sharply changed in that place. In this case, there is a possibility that strain or an excess material is extremely concentrated on that place during the forming, resulting in the generation of cracks or wrinkles. To prevent that, the adjustment unit 13A of this embodiment changes the line length distribution in the circumferential direction such that a line length difference between $L_i4$, and $L_{(i-1)}4$ and $L_{(i+1)}4$, which is the cross-sectional line length difference between the adjacent steps, decreases and determines a cross-sectional line length $L_i5$.

Specifically, $L_i5$ is determined to satisfy Expression (3) and Expression (4) below.

$$L_i 5 \leq c \cdot (L_{(i-1)}4 + L_{(i+1)}4)/2 \qquad (3)$$

In Expression (3), $0.75 \leq c \leq 1.25$ is established.

$$L_1 5 + \ldots + L_i 5 + \ldots L_n 5 = L_1 4 + \ldots + L_i 4 + \ldots L_n 4 \qquad (4)$$

c in Expression (3) defines the upper and lower limits of the line length difference between the adjacent cross sections. The range of c is $0.75 \leq c \leq 1.25$ and desirably $0.85 \leq c \leq 1.15$.

Further, $L_i5$ needs to satisfy Expression (4). More specifically, the sum of all of $L_i4$ and the sum of all of $L_i5$ are regulated to be equal to each other.

The sum of the cross-sectional line lengths further approaches the surface area with an increase in the number n of the cross sections. Also from this viewpoint, it is better for n to take a large number. More specifically, regulating that the sum of all of $L_i4$ and the sum of all of $L_i5$ are equal to each other is equivalent to changing the cross-sectional shape without changing the surface area. By partially adjusting the line length without changing the surface area, the local elongation of the material can be suppressed without changing the elongation of the material as a whole.

When the condition of Expression (4) is not satisfied after the processing up to Expression (3) has been performed, the processing of Expression (5) is performed and $L_i5$ is adjusted to satisfy Expression (4).

$$L_i 5 \leq d \cdot (L_{(i-1)}5 + L_{(i+1)}5)/2 \qquad (5)$$

In Expression (5), $0.75 \leq d \leq 1.25$ is established.

The range of d is desirably $0.85 \leq d \leq 1.15$.

<Shape Design Setting Unit 13B>

The shape setting unit 13B designs the preformed shape for (m−1) steps using the cross-sectional line length $L_i5$ obtained through all of the processing above. The (m−1) steps refer to steps from the reference step to the step one before the selection step.

The design in each step is performed by combining continuous curved surfaces in which the cross section at the i-th position has the $L_i5$ line length and which are smoothly connected to the (i−1)-th and (i+1)-th cross sections adjacent to each other. The design shape desirably satisfies conditions (1) to (4).

(1) The shape is smoothly connected to a shape other than a design site.

(2) The shape has a smooth curved cross section and has no singular points in the cross section.

(3) The shape does not interfere with a die when set in the die in the next step.

(4) The shape does not contact a die before blank holding in the next step.

Then, a die shape of a die corresponding to the preformed shape of the determined shape is designed.

Herein, when the required inflow amount of the material cannot be successfully distributed with the current number of the press steps, it may be acceptable that the number of the press steps is increased, and then the processing above is carried out again. When the distribution of the inflow amount in each step has an allowance equal to or larger than a predetermined allowance, it may be acceptable that the number of steps is reduced, and the design of the preformed shape (die shape) in each step above is carried out. The number of steps may be optimized based on the final component shape by the processing of this embodiment.

(Die)

Examples of dies each designed by the die shape designing device of this embodiment and used in each step are described.

The dies described below each are a die used in each step from the reference step to the selection step. The forming surfaces of the dies are as follows.

The forming surface of the die in the selection step follows the shape of the selected component shape.

Herein, a line orthogonal to, in plan view, the direction in which the material flows when the metal sheet of the reference shape is drawn into the selected component shape by a single step using the die in the selection step is set, and a plurality of cross sections is set which is individually cut by each of planes orthogonal to the line in plan view and extending in a direction along the sheet thickness direction of the metal sheet before forming.

For each cross section arranged along the extending direction of the set line, each of the cross-sectional shapes cut by the plurality of cross sections in the forming surface of the die in each step is set from the inflow amount of the material set based on the cross-sectional line length of the selected component shape cut by the cross section, the cross-sectional line length in the reference shape cut by the same cross section as the cross section, and the uniform elongation of the material of the metal sheet.

The number of the plurality of cross sections is defined as n, the subscript identifying each cross section is defined as i ($1 \leq i \leq n$), the line length in the selected component shape is defined as $L_i 1$ and the line length in the reference shape is defined as $L_i 2$, which are cut by the same cross section for each cross section, the uniform elongation of the material is defined as El, the number of the press steps from the reference step to the selection step is defined as m, and the subscript identifying the press step is defined as j ($1 \leq j \leq m$).

In this case, for the set inflow amount of the material, the inflow amount ($L_i 3$) of the cross section i is set by Expression (1) below.

The cross-sectional line length ($L_i 4$) of the cross section i in the forming surface of a die used in the j-th step is represented by Expression (2) below.

The coefficient $b_k$ ($1 \leq k \leq m$) satisfies $\Sigma_{j=1}^{m}(b_k)=1$.

$$L_i 3 = L_i 1 - L_i 2 - a \cdot El \quad (1)$$

In Expression (1), $0 < a < 1$ is established.

$$L_i 4 = L_i 2 + \Sigma_{k=1}^{j}(b_k \cdot L_i 3) \quad (2)$$

In Expression (2), $0 \leq b_k \leq 1$ is established.

Herein, the selection step can be set as the final press step and the reference step can be set as the first press step.

The die is suitable for a case where the selected component shape has a drawn area in which the projection portion extends in the predetermined direction and in which, when the metal sheet is drawn into the component shape by a single step, the material flows toward the position where the projection portion is formed from a direction crossing the predetermined direction in plan view. In this case, a line portion passing through the drawn area among the set lines may be set as a line along the predetermined direction.

Further, it is preferable that the cross-sectional line length difference between the adjacent cross sections is equal to or less than the preset value in the forming surface of the die for each step above.

For example, based on the condition that the total sum of the cross-sectional line lengths $L_1 4$ to $L_n 4$ in the forming surface in a target step is not changed, the distribution of the cross-sectional line lengths $L_1 4$ to $L_n 4$ is adjusted, and then the cross-sectional line lengths $L_1 5$ to $L_n 5$ after the adjustment are set.

Herein, the cross-sectional line length $L_i 4$ for each cross section defining the shape of the forming surface in each press step, is calculated. There is sometimes a cross section in which the cross-sectional line length $L_i 4$ in a certain step, among the cross-sectional line lengths, is extremely longer or shorter than the cross-sectional line length $L_{(i-1)} 4$ in a step one before the certain step and the cross-sectional line length $L_{(i+1)} 4$ in a step one after the certain step. This case means that the component shape is sharply changed in that place. In this case, there is a possibility that strain or an excess material is extremely concentrated on that place during the forming, resulting in the generation of cracks or wrinkles. To prevent that, the line length distribution is changed in the circumferential direction such that a line length difference between $L_i 4$, and $L_{(i-1)} 4$ and $L_{(i+1)} 4$, which is the cross-sectional line length difference between the adjacent steps, decreases, and the cross-sectional line length $L_i 5$ is determined.

Specifically, $L_i 5$ is determined to satisfy Expression (3) and Expression (4) below.

$$L_i 5 \leq c \cdot (L_{(i-1)} 4 + L_{(i+1)} 4)/2 \quad (3)$$

In Expression (3), $0.75 \leq c \leq 1.25$ is established.

$$L_1 5 + \ldots + L_i 5 + \ldots L_n 5 = L_1 4 + \ldots + L_i 4 + \ldots L_n 4 \quad (4)$$

c in Expression (3) defines the upper and lower limits of the line length difference between the adjacent cross sections. The range of c is $0.75 \leq c \leq 1.25$ and desirably $0.85 \leq c \leq 1.15$.

Further, $L_i 5$ needs to satisfy Expression (4). More specifically, the sum of all of $L_i 4$ and the sum of all of $L_i 5$ are regulated to be equal to each other.

The sum of the cross-sectional line lengths further approaches the surface area with an increase in the number n of the cross sections. Also from this viewpoint, it is better for n to take a large number. More specifically, regulating that the sum of all of $L_i 4$ and the sum of all of $L_i 5$ are equal to each other is equivalent to changing the cross-sectional shape without changing the surface area. By partially adjusting the line length without changing the surface area, the local elongation of the material can be suppressed without changing the elongation of the material as a whole.

When the condition of Expression (4) is not satisfied after the processing up to Expression (3) has been performed, the processing of Expression (5) below is performed and $L_i 5$ is adjusted to satisfy Expression (4).

$$L_i 5 \leq d \cdot (L_{(i-1)} 5 + L_{(i+1)} 5)/2 \quad (5)$$

In Expression (5), $0.75 \leq d \leq 1.25$ is established.

The range of d is desirably $0.85 \leq d \leq 1.15$.

(Operations and Others)

In this embodiment, the metal sheet is press formed into the final component shape through two or more press steps including the press step carried out by the drawing. In the manufacture of this pressed component, the inflow amount in each step in each cross section is set to a proper value, and each preformed shape (die shape) in each step is set.

Therefore, even when the pressed component shape that cannot be formed without being greatly drawn is manufactured, the inflow amount of the material gained in each press step can be properly set. As a result, the generation of cracks or wrinkles can be suppressed in the manufactured pressed component.

Further, a cushion pressure in the press forming, the bead shape of the die, and the like are adjusted, and then the inflow amount in each place is adjusted to have a value close to the cross-sectional line length $L_i3$. This makes it possible to minimize the inflow of the material and improve the yield.

More specifically, this embodiment sets a plurality of cross sections almost parallel to the press direction from the component shape obtained in the final press step and a blank in the initial state when the drawing is performed by a plurality of steps, for example. Then, from the cross sections, the finally required cross-sectional line length and the initial cross-sectional shape are calculated. Based on the calculation result and the uniform elongation of a material to be used, the inflow amount required for the forming is calculated. The determined inflow amount is distributed to each step, and the cross-sectional line length in each step is calculated. Based on the calculated cross-sectional line length, a die shape (preformed shape) in each step (not required in the final press step) is designed. By performing the press forming in each step using the designed die, a pressed component (pressed component of the final component shape) free from cracks or wrinkles and having a maximally improved yield can be obtained.

Herein, when the inflow amount of the material is excessively small in the forming by the drawing, the material is insufficient in the pressed component, so that the elongation of the material exceeds the limit, resulting in the generation of cracks. Conversely, when the inflow amount of the material is excessively large, the material in the pressed component is sufficient, and therefore cracks are less likely to generate. However, there is concern that wrinkles are generated when the amount of the material to be led is excessively large. Further, it is disadvantageous from the viewpoint of the material yield, and therefore it is important to optimize the inflow amount.

When the forming is performed by a common forming method, the drawing introduces less strain into the material of a punch bottom due to frictional resistance, bending resistance in a punch shoulder, or the like. Therefore, strain increases in the punch shoulder, a die shoulder, or a wall portion between the punch shoulder and the die shoulder, so that cracks are generated in that place in many cases. Therefore, there is a risk that, even though the introduced strain amount is small, the strain is locally concentrated, causing cracking in the pressed component as a whole. More specifically, it is difficult to say that the elongation of the material is fully utilized in many cases.

In contrast thereto, this embodiment can estimate the inflow amount required when the target shape is formed by drawing without excess or deficiency. In addition, this embodiment forms the material into a shape having a proper cross-sectional line length while causing the material to flow by dividing the inflow amount in each step. As a result, an improvement of the formability and the yield can also be achieved by introducing strain in advance in the previous step into the vicinity of the punch bottom where strain is difficult to enter in common forming.

(Others)

This disclosure can also take the following configurations.

(1) A pressed component manufacturing method for press forming a metal sheet into a final component shape through a plurality of press steps, in which, when one step is selected from the plurality of press steps and set as a selection step, a component shape obtained in the selection step is set as the selected component shape 1, one press step selected from the plurality of press steps and carried out before the selection step is set as a reference step, and the shape of the metal sheet before press forming in the reference step is set as the reference shape 6, the press steps from the reference step to the selection step include a press step having drawing, and the pressed component manufacturing method is configured to include: a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along the sheet thickness direction of the metal sheet before forming; an inflow amount calculation step of individually determining the inflow amount of the material required for forming the reference shape 6 into the selected component shape 1 based on a cross-sectional line length of the selected component shape 1 cut by the cross section, the cross-sectional line length in the reference shape 6 cut by the same cross section as the cross section, and the uniform elongation of the material of the metal sheet for each cross section; an inflow amount distribution step of distributing the determined inflow amount to each step from the reference step to the selection step for each cross section; a cross-sectional line length calculation step of individually calculating the cross-sectional line length for each cross section in each step from the reference step to a step one before the selection step based on the distributed inflow amount; and a shape determination step of determining a preformed shape after the press forming in each step from the reference step to the step one before the selection step based on the calculated cross-sectional line length.

At this time, the selection step can be set as the final press step and the reference step can be set as the first press step.

This configuration can provide a pressed component manufacturing method applicable even when a pressed component shape that cannot be formed without being greatly drawn is manufactured.

(2) The selected component shape has the drawn area 1A in which a projection portion extends in the predetermined direction and in which, when the metal sheet is drawn into the selected component shape by a single step, the material flows toward a position where the projection portion is formed from a direction crossing the predetermined direction in plan view, and the cross section setting step sets a line portion passing through the drawn area 1A among the set lines as a line along the predetermined direction.

This configuration can provide a pressed component manufacturing method applicable even when a pressed component shape having one or two or more of the drawn areas 1A that cannot be formed without being greatly drawn is manufactured.

(3) The shape determination step has an adjustment step of adjusting the length of the cross-sectional line length for each cross section on the condition that the total sum of the cross-sectional line length for each cross section calculated in the cross-sectional line length calculation step is not changed for each step from the reference step to the step one before the selection step, and the shape determination step determines the preformed shape after the press forming based on the cross-sectional line length for each cross section after the adjustment in the adjustment step.

For example, the adjustment step adjusts the cross-sectional line length based on a cross-sectional line length difference between the adjacent cross sections.

This configuration can more properly set the inflow amount of the material gained in each press step even when of the pressed component shape that cannot be formed without being greatly drawn is manufactured.

Herein, when the selected component shape 1 has the projection portion having a steep cross section extending in the predetermined direction when formed by a single press step, a plurality of cross sections defined by the line α is arranged side by side along the extending direction. Then, the position of each cross section is likely to be set in a direction along the main material flow direction, and the flow amount of the material can be more properly distributed.

Further, by forming the plurality of cross sections with the line α as a reference, the plurality of cross sections is set side by side along the line α in plan view, and therefore the adjustment of the line length between the cross sections in the adjustment unit 13A can be easily and reliably carried out.

(4) When the number of the plurality of cross sections is defined as n, the subscript identifying each cross section is defined as i (1≤i≤n), the line length in the selected component shape 1 is defined as $L_i1$ and the line length in the reference shape 6 is defined as $L_i2$, which are cut by the same cross section for each cross section, the uniform elongation of the material is defined as El, the number of the press steps from the reference step to the selection step is defined as m, and the subscript identifying the press step is defined as j (1≤j≤m), the inflow amount ($L_i3$) of the cross section i calculated in the inflow amount calculation step is determined by Expression (1) below, the cross-sectional line length ($L_i4$) of the cross section i in the j-th step calculated in the cross-sectional line length calculation step is determined by Expression (2) below, the coefficient a in Expression (1) sets the elongation degree of the material with respect to the uniform elongation of the material, the coefficient $b_k$ in Expression (2) sets the inflow degree of the material in the j-th step among all of m times of press steps, and the coefficient $b_k$ (1≤k≤m) is set to satisfy $\Sigma_{j=1}^{m}(b_k)=1$, $$L_i3=L_i1-L_i2-a\cdot El \quad (1),$$

in Expression (1), 0<a<1 is established, $$L_i4=L_i2+\Sigma_{k=1}^{j}(b_k\cdot L_i3) \quad (2)$$

in Expression (2), 0≤$b_k$≤1 is established.

This configuration can more reliably set an appropriate cross-sectional line length in each step.

(5) A die designing method, the die being used in press forming a metal sheet into a final component shape through two or more steps including a press step carried out by drawing, includes determining the inflow amount of the material required for forming the metal sheet into the final component shape based on the increase in the line length of the final component shape with respect to the line length before forming in the press forming of the metal sheet into the final component shape by a single press step, distributing the determined inflow amount of the material to each step including the final press step, and determining a die shape used in the steps other than the final press step based on the distributed inflow amount.

For example, a die designing method, the die being used in press forming a metal sheet into a final component shape through a plurality of press steps, in which, when one step is selected from the plurality of press steps and set as a selection step, a component shape obtained in the selection step is set as the selected component shape 1, one press step selected from the plurality of press steps and carried out before the selection step is set as a reference step, and the shape of the metal sheet before press forming in the reference step is set as the reference shape 6, the press steps from the reference step to the selection step include a press step having drawing, and the die designing method includes: a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along the sheet thickness direction of the metal sheet before forming; an inflow amount calculation step of individually determining the inflow amount of the material required for forming the reference shape 6 into the selected component shape 1 based on a cross-sectional line length of the selected component shape 1 cut by the cross section, the cross-sectional line length in the reference shape 6 cut by the same cross section as the cross section, and the uniform elongation of the material of the metal sheet for each cross section; an inflow amount distribution step of distributing the determined inflow amount to each step from the reference step to the selection step for each cross section; a cross-sectional line length calculation step of individually calculating the cross-sectional line length for each cross section in each step from the reference step to the step one before the selection step based on the distributed inflow amount; and a shape determination step of determining a die shape used in each step from the reference step to the step one before the selection step based on the calculated cross-sectional line length.

The selection step can be set as the final press step and the reference step can be set as the first press step.

This configuration can design a die shape in each step applicable even when a pressed component shape that cannot be formed without being greatly drawn is manufactured.

(6) The shape determination step has an adjustment step of adjusting the length of the cross-sectional line length for each cross section on the condition that the total sum of the cross-sectional line length for each cross section calculated in the cross-sectional line length calculation step is not changed for each step from the reference step to the step one before the selection step, and the shape determination step determines the preformed shape after the press forming based on the cross-sectional line length for each cross section after the adjustment in the adjustment step.

The adjustment step adjusts the cross-sectional line length based on the cross-sectional line length difference between the adjacent cross sections, for example.

This configuration can design a die capable of properly setting the inflow amount of the material gained in each press step even when of the pressed component shape that cannot be formed without being greatly drawn is manufactured.

(7) The die designing method is configured such that, when the number of the plurality of cross sections is defined as n, the subscript identifying each cross section is defined as i (1≤i≤n), the line length in the selected component shape 1 is defined as $L_i1$ and the line length in the reference shape 6 is defined as $L_i2$, which are cut by the same cross section for each cross section, the uniform elongation of the material is defined as El, the number of the press steps from the reference step to the selection step is defined as m, and the subscript identifying the press step is defined as j (1≤j≤m), the inflow amount ($L_i3$) of the cross section i calculated in the inflow amount calculation step is determined by Expression (1) below, the cross-sectional line length ($L_i4$) of the cross section i in the j-th step calculated in the cross-sectional line length calculation step is determined by Expression (2) below, the coefficient a in Expression (1) sets the elongation degree of the material with respect to the uniform elongation of the material, the coefficient $b_k$ in Expression (2) sets the inflow degree of the material in the j-th step among all of m times of press steps, and the coefficient $b_k$ ($1 \le k \le m$) satisfies $\Sigma_{j=1}^{m}(b_k)=1$, $$L_i3=L_i1-L_i2-a\cdot El \qquad (1),$$

in Expression (1), $0<a<1$ is established, $$L_i4=L_i2+\Sigma_{k=1}^{j}(b_k\cdot L_i3) \qquad (2)$$

in Expression (2), $0 \le b_k \le 1$ is established.

This configuration can more reliably design a die shape in which an appropriate cross-sectional line length in each step is set.

(8) A pressed component manufacturing method using the die designed by the die designing method is provided.

This configuration can provide a pressed component manufacturing method applicable even when a pressed component shape that cannot be formed without being greatly drawn is manufactured.

(9) A die shape designing device for, in press forming a metal sheet into a final component shape through a plurality of press steps, determining a die shape of a die used in each step excluding a final press step, in which, when one step is selected from the plurality of press steps and set as a selection step, a component shape obtained in the selection step is set as the selected component shape 1, one press step selected from the plurality of press steps and carried out before the selection step is set as a reference step, and the shape of the metal sheet before press forming in the reference step is set as the reference shape 6, the press steps from the reference step to the selection step include a press step having drawing, and the die shape designing device includes: the cross section setting unit 10 configured to set a line orthogonal to, in plan view, a direction in which a material flows when the metal sheet of the reference shape is drawn into the selected component shape by a single step, and set a plurality of cross sections individually cut by each of planes orthogonal to the line in plan view and extending in a direction along the sheet thickness direction of the metal sheet before forming; the inflow amount calculation unit 11B configured to individually determine the inflow amount of the material required for forming the reference shape 6 into the selected component shape 1 based on a cross-sectional line length of the selected component shape 1 cut by the cross section, the cross-sectional line length in the reference shape 6 cut by the same cross section as the cross section, and the uniform elongation of the material of the metal sheet for each cross section; the inflow amount distribution unit 12A configured to distribute the determined inflow amount to each step from the reference step to the selection step for each cross section; the cross-sectional line length calculation unit 12B configured to individually calculate the cross-sectional line length for each cross section in each step from the reference step to a step one before the selection step based on the distributed inflow amount; and the shape determination unit 13 configured to determine the die shape in each step from the reference step to the step one before the selection step based on the calculated cross-sectional line length.

The selection step can be set as the final press step and the reference step can be set as the first press step.

This configuration can design a die shape in each step applicable even when a pressed component shape that cannot be formed without being greatly drawn is manufactured.

(10) The shape determination unit 13 has the adjustment unit 13A configured to adjust the length of the cross-sectional line length for each cross section on the condition that the total sum of the cross-sectional line length for each cross section calculated by the cross-sectional line length calculation unit 12B is not changed for each step from the reference step to the step one before the selection step, and the shape determination unit 13 determines the die shape based on the cross-sectional line length for each cross section after the adjustment by the adjustment unit 13A.

For example, in the adjustment unit 13A, the cross-sectional line length is adjusted based on the cross-sectional line length difference between the adjacent cross sections, for example.

The selected component shape 1 preferably has a shape in which the material flows from a plurality of directions on the outer periphery toward the center side of the sheet in plan view when forming is performed by a single press step. For example, the selected component shape 1 is set to a shape including a top sheet portion and an endless annular side wall portion in plan view continuous to the entire outer periphery of the top sheet portion.

This configuration can design a die capable of more properly setting the inflow amount of the material gained in each press step even when the pressed component shape that cannot be formed without being greatly drawn is manufactured.

(11) The die shape designing device is configured such that, when the number of the plurality of cross sections is defined as n, the subscript identifying each cross section is defined as i ($1 \le i \le n$), the line length in the selected component shape 1 is defined as $L_i1$ and the line length in the reference shape 6 is defined as $L_i2$, which are cut by the same cross section for each cross section, the uniform elongation of the material is defined as El, the number of the press steps from the reference step to the selection step is defined as m, and the subscript identifying the press step is defined as j ($1 \le j \le m$), the inflow amount ($L_i3$) of the cross section i calculated by the inflow amount calculation unit 11B is determined by Expression (1) below, the cross-sectional line length ($L_i4$) of the cross section i in the j-th step calculated by the cross-sectional line length calculation unit 12B is determined by Expression (2) below, the coefficient a in Expression (1) sets the elongation degree of the material with respect to the uniform elongation of the material, the coefficient $b_k$ in Expression (2) sets the inflow degree of the material in the j-th step among all of m times of press steps, and the coefficient $b_k$ ($1 \le k \le m$) satisfies $\Sigma_{j=1}^{m}(b_k)=1$, $$L_i3=L_i1-L_i2-a\cdot El \qquad (1)$$

in Expression (1), $0<a<1$ is established, $$L_i4=L_i2+\Sigma_{k=1}^{m}(b_k\cdot L_i3) \qquad (2),$$

in Expression (2), $0 \le b_k \le 1$ is established.

This configuration can more reliably design a die shape in which an appropriate cross-sectional line length in each step is set.

(12) Each die used in each step when a pressed component is manufactured by press forming a metal sheet into a final component shape through a plurality of press steps, in which
one step is selected from the plurality of press steps and set as a selection step, a component shape obtained in the selection step is set as a selected component shape, one press step selected from the plurality of press steps and carried out before the selection step is set as a reference step, the shape of the metal sheet before press forming in the reference step is set as a reference shape, and the press steps from the reference step to the selection step include a press step having drawing, for the forming surface of each die used in each step from the reference step to the selection step, the forming surface of the die in the selection step has a shape following the selected component shape, a line is set, which is orthogonal to, in plan view, a direction in which a material flows when the metal sheet of the reference shape is drawn into the selected component shape by a single step using the die in the selection step, and a plurality of cross sections is set which is individually cut by each of planes orthogonal to the line in plan view and extending in a direction along the sheet thickness direction of the metal sheet before forming, for each cross section arranged along the extending direction of the set line, each of the cross-sectional shapes cut by the plurality of cross sections in the forming surface of the die in each step is set from the inflow amount of the material set based on the cross-sectional line length of the selected component shape cut by the cross section, the cross-sectional line length in the reference shape cut by the same cross section as the cross section, and the uniform elongation of the material of the metal sheet, when the number of the plurality of cross sections is defined as n, the subscript identifying each cross section is defined as i ($1 \leq i \leq n$), the line length in the selected component shape is defined as $L_i1$ and the line length in the reference shape is defined as $L_i2$, which are cut by the same cross section for each cross section, the uniform elongation of the material is defined as El, the number of the press steps from the reference step to the selection step is defined as m, and the subscript identifying the press step is defined as j ($1 \leq j \leq m$), for the set inflow amount of the material, the inflow amount ($L_i3$) of the cross section i is set by Expression (1) below, the cross-sectional line length ($L_i4$) of the cross section i in the forming surface of a die used in the j-th step is represented by Expression (2) below, and the coefficient $b_k$ ($1 \leq k \leq m$) satisfies $\Sigma_{j=1}^{m}(b_k)=1$, $$L_i3 = L_i1 - L_i2 - a \cdot El \qquad (1),$$

in Expression (1), $0 < a < 1$ is established, $$L_i4 = L_i2 + \Sigma_{k=1}^{j}(b_k \cdot L_i3) \qquad (2)$$

in Expression (2), $0 \leq b_k \leq 1$ is established.

(13) The selection step is the final press step and the reference step is the first press step.

(14) The selected component shape has a drawn area in which the projection portion extends in the predetermined direction and in which, when the metal sheet is drawn into the selected component shape by a single step, the material flows toward the position where the projection portion is formed from the direction crossing the predetermined direction in plan view, and a line portion passing through the drawn area among the set lines as a line along the predetermined direction.

(15) In the forming surface of the die for each step above, a cross-sectional line length difference between the adjacent cross sections is equal to or less than the preset value.

EXAMPLES

A case of manufacturing a pressed component by press forming a blank containing a metal sheet into a final component shape as illustrated in FIG. 2 was examined.

Figure 6A:
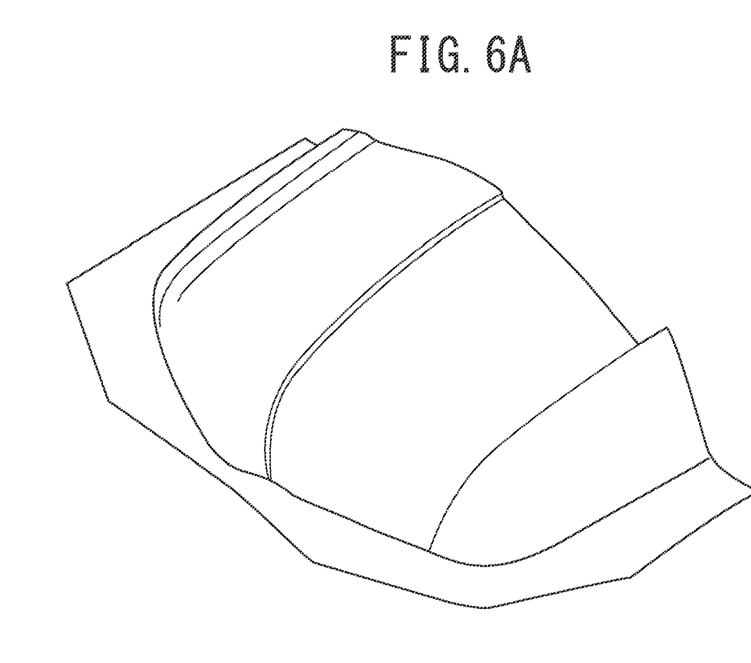
FIGS. 6A and 6B are views for explaining a setting example in Examples.
Figure 6B:
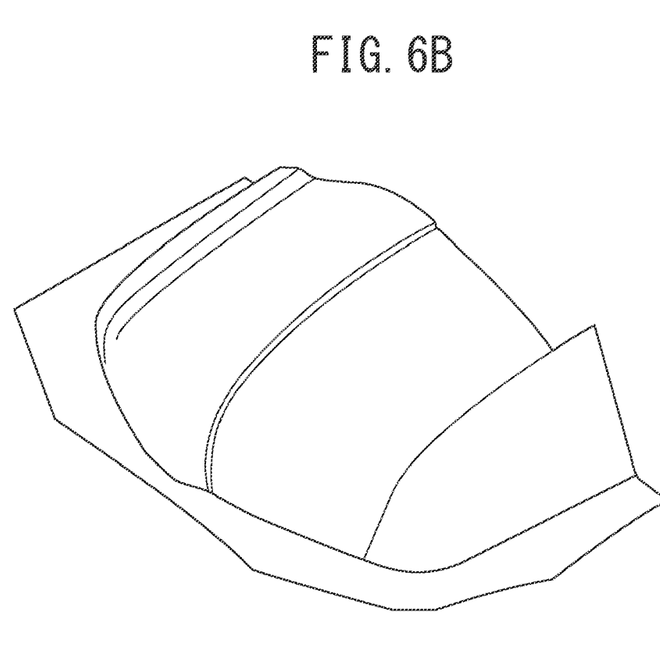

In Example 1 based on this embodiment, a preformed shape in a first press step was designed on the following conditions: Number of cross sections n=20, Number of press steps m=2, Coefficient a=0.5, and Coefficient b=0.9. The preformed shape is illustrated in FIG. 6A. FIG. 6B illustrates a final component shape. In this Example 1, the processing of the adjustment step (adjustment unit 13A) was omitted. In this example, the first press step has the drawing.

As the metal sheet, a GA steel sheet (alloyed hot dip galvanized steel sheet) with a material tensile strength of 270 MPa grade was used, and the thickness was set to 0.65 mmt.

When this metal sheet was press formed by two press steps using the die shape of the preformed shape, a good product free from cracks or wrinkles in the formation into the final component shape was able to be obtained.

On the other hand, when the blank was press formed into the final component shape by a single press step, a large crack was generated in a part of the drawn area 1A, and thus the performance as a product was not satisfied.

As described above, by designing the preformed shape (die shape) in each step based on the present invention, it becomes possible to obtain a good product free from cracks or wrinkles.

The entire contents of JP 2020-147655 A (filed Sep. 2, 2020), for which this application claims priority, form part of this disclosure by reference. Herein, the description is given with reference to a limited number of embodiments, but the scope of the invention is not limited thereto and modifications of each embodiment based on the disclosure above are obvious to those skilled in the art.

REFERENCE SIGNS LIST 1 selected component shape
1A drawn area
6 reference shape
10 cross section setting unit
11 required inflow amount arithmetic operation unit
11A line length calculation unit
11B inflow amount calculation unit
12 cross sectional component line length arithmetic operation unit
12A inflow amount distribution unit
12B cross sectional line length calculation unit
13 shape determination unit
13A adjustment unit
13B shape setting unit
α line

The invention claimed is:

1. A pressed component manufacturing method for press forming a metal sheet into a final component shape through a plurality of press steps, the component manufacturing method comprising:

selecting one step from the plurality of press steps and setting the one step as a selection step, a component shape obtained in the selection step being set as a selected component shape;

selecting one press step from the plurality of press steps to be carried out before the selection step and setting the one press step as a reference step, a shape of the metal sheet before press forming in the reference step being set as a reference shape, wherein the press steps from the reference step to the selection step include a press step having drawing;

a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along a sheet thickness direction of the metal sheet before forming;

an inflow amount calculation step of individually determining the inflow amount of the material required for forming the reference shape into the selected component shape based on a cross-sectional line length of the selected component shape cut by the cross section, a cross-sectional line length in the reference shape cut by a same cross section as the cross section, and a uniform elongation of the material of the metal sheet for each cross section;

an inflow amount distribution step of distributing the determined inflow amount to each step from the reference step to the selection step for each cross section;

a cross-sectional line length calculation step of individually calculating the cross-sectional line length for each cross section in each step from the reference step to a step one before the selection step based on the distributed inflow amount;

a shape determination step of determining a preformed shape after the press forming in each step from the reference step to the step one before the selection step based on the calculated cross-sectional line length; and a manufacturing step of pressing the metal sheet into the final component shape through the plurality of press steps.

2. The pressed component manufacturing method according to claim 1, wherein the selection step is a final press step and the reference step is a first press step.

3. The pressed component manufacturing method according to claim 1, wherein the selected component shape has a drawn area in which a projection portion extends in a predetermined direction and in which, when the metal sheet is drawn into the selected component shape by a single step, the material flows toward a position where the projection portion is formed from a direction crossing the predetermined direction in plan view, and the cross section setting step sets a line portion passing through the drawn area among the set lines as a line along the predetermined direction.

4. The pressed component manufacturing method according to claim 1, wherein the shape determination step has an adjustment step of adjusting a length of the cross-sectional line length for each cross section on a condition that a total sum of the cross-sectional line length for each cross section calculated in the cross-sectional line length calculation step is not changed for each step from the reference step to the step one before the selection step, and the shape determination step determines the preformed shape after the press forming based on the cross-sectional line length for each cross section after the adjustment in the adjustment step.

5. The pressed component manufacturing method according to claim 4, wherein the adjustment step adjusts the cross-sectional line length based on a cross-sectional line length difference between adjacent cross sections.

6. The pressed component manufacturing method according to claim 1, wherein when a number of the plurality of cross sections is defined as n, a subscript identifying each cross section is defined as i ($1 \leq i \leq n$), a line length in the selected component shape is defined as $L_i 1$ and a line length in the reference shape is defined as $L_i 2$, which are cut by the same cross section for each cross section, the uniform elongation of the material is defined as El, a number of the press steps from the reference step to the selection step is defined as m, and a subscript identifying the press step is defined as j ($1 \leq j \leq m$), an inflow amount ($L_i 3$) of the cross section i calculated in the inflow amount calculation step is determined by Expression (1) below, a cross-sectional line length ($L_i 4$) of the cross section i in a j-th step calculated in the cross-sectional line length calculation step is determined by Expression (2) below, a coefficient a in Expression (1) sets an elongation degree of the material with respect to the uniform elongation of the material, a coefficient $b_k$ in Expression (2) sets an inflow degree of the material in the j-th step among all of m times of press steps, and the coefficient $b_k$ ($1 \leq k \leq m$) satisfies $\Sigma_{j=1}^{m}(b_k)=1$, $$L_i 3 = L_i 1 - L_i 2 - a \cdot El \quad (1),$$

wherein $0 < a < 1$ is established, $$L_i 4 = L_i 2 + \Sigma_{k=1}^{j}(b_k \cdot L_i 3) \quad (2),$$

wherein $0 \leq b_k \leq 1$ is established.

7. A die designing method, the die being used in press forming a metal sheet into a final component shape through a plurality of press steps, the die designing method comprising:

selecting one step from the plurality of press steps and setting the one step as a selection step, a component shape obtained in the selection step being set as a selected component shape;

selecting one press step from the plurality of press steps to be carried out before the selection step and setting the one press step as a reference step, a shape of the metal sheet before press forming in the reference step being set as a reference shape, wherein the press steps from the reference step to the selection step include a press step having drawing, a cross section setting step of setting a line orthogonal to, in plan view, a direction in which a material flows when the metal sheet of the reference shape is drawn into the selected component shape by a single step, and setting a plurality of cross sections individually cut by each of planes orthogonal to the line in plan view and extending in a direction along a sheet thickness direction of the metal sheet before forming;

an inflow amount calculation step of individually determining the inflow amount of the material required for forming the reference shape into the selected component shape based on a cross-sectional line length of the selected component shape cut by the cross section, a cross-sectional line length in the reference shape cut by a same cross section as the cross section, and a uniform elongation of the material of the metal sheet for each cross section;

an inflow amount distribution step of distributing the determined inflow amount to each step from the reference step to the selection step for each cross section;

a cross-sectional line length calculation step of individually calculating the cross-sectional line length for each cross section in each step from the reference step to a step one before the selection step based on the distributed inflow amount; and a shape determination step of determining a die shape used in each step from the reference step to the step one before the selection step based on the calculated cross-sectional line length, a manufacturing step of manufacturing a die having the determined die shape in a step from the reference step to the step one before the selection step.

8. The die designing method according to claim 7, wherein the selection step is a final press step and the reference step is a first press step.

9. The die designing method according to claim 7, wherein the selected component shape has a drawn area in which a projection portion extends in a predetermined direction and in which, when the metal sheet is drawn into the selected component shape by a single step, the material flows toward a position where the projection portion is formed from a direction crossing the predetermined direction in plan view, and the cross section setting step sets a line portion passing through the drawn area among the set lines as a line along the predetermined direction.

10. The die designing method according to claim 7, wherein the shape determination step has an adjustment step of adjusting a length of the cross-sectional line length for each cross section on a condition that a total sum of the cross-sectional line length for each cross section calculated in the cross-sectional line length calculation step is not changed for each step from the reference step to the step one before the selection step, and the shape determination step determines the preformed shape after the press forming based on the cross-sectional line length for each cross section after the adjustment in the adjustment step.

11. The die designing method according to claim 10, wherein the adjustment step adjusts the cross-sectional line length based on a cross-sectional line length difference between adjacent cross sections.

12. The die designing method according to claim 7, wherein when a number of the plurality of cross sections is defined as n, a subscript identifying each cross section is defined as i ($1 \leq i \leq n$), a line length in the selected component shape is defined as $L_i 1$ and a line length in the reference shape is defined as $L_i 2$, which are cut by the same cross section for each cross section, the uniform elongation of the material is defined as El, a number of the press steps from the reference step to the selection step is defined as m, and a subscript identifying the press step is defined as j ($1 \leq j \leq m$), an inflow amount ($L_i 3$) of the cross section i calculated in the inflow amount calculation step is determined by Expression (1) below, a cross-sectional line length ($L_i 4$) of the cross section i in a j-th step calculated in the cross-sectional line length calculation step is determined by Expression (2) below, a coefficient a in Expression (1) sets an elongation degree of the material with respect to the uniform elongation of the material, a coefficient $b_k$ in Expression (2) sets an inflow degree of the material in the j-th step among all of m times of press steps, and the coefficient $b_k$ ($1 \leq k \leq m$) is set to satisfy $\Sigma_{j=1}^{m}(b_k)=1$, $$L_i 3 = L_i 1 - L_i 2 - a \cdot El \quad (1),$$

wherein $0 < a < 1$ is established, $$L_i 4 = L_i 2 + \Sigma_{k=1}^{j}(b_k \cdot L_i 3) \quad (2),$$

wherein $0 \leq b_k \leq 1$ is established.

13. A pressed component manufacturing method using the die designed by the die designing method according to claim 7.

14. A die shape designing device for, in press forming a metal sheet into a final component shape through a plurality of press steps, determining a die shape of a die used in each step excluding a final press step, wherein when one step is selected from the plurality of press steps and set as a selection step, a component shape obtained in the selection step is set as a selected component shape, one press step selected from the plurality of press steps and carried out before the selection step is set as a reference step, and a shape of the metal sheet before press forming in the reference step is set as a reference shape, the press steps from the reference step to the selection step include a press step having drawing, the die shape designing device comprising:

a cross section setting unit configured to set a line orthogonal to, in plan view, a direction in which a material flows when the metal sheet of the reference shape is drawn into the selected component shape by a single step, and set a plurality of cross sections individually cut by each of planes orthogonal to the line in plan view and extending in a direction along a sheet thickness direction of the metal sheet before forming;

an inflow amount calculation unit configured to individually determine the inflow amount of the material required for forming the reference shape into the selected component shape based on a cross-sectional line length of the selected component shape cut by the cross section, a cross-sectional line length in the reference shape cut by a same cross section as the cross section, and a uniform elongation of the material of the metal sheet for each cross section;

an inflow amount distribution unit configured to distribute the determined inflow amount to each step from the reference step to the selection step for each cross section;

a cross-sectional line length calculation unit configured to individually calculate the cross-sectional line length for each cross section in each step from the reference step to a step one before the selection step based on the distributed inflow amount; and a shape determination unit configured to determine the die shape in each step from the reference step to the step one before the selection step based on the calculated cross-sectional line length, wherein a die is manufactured having a determined die shape in a step from the reference step to the step one before the selection step.

15. The die shape designing device according to claim 14, wherein the selection step is the final press step and the reference step is a first press step.

16. The die shape designing device according to claim 14, wherein the selected component shape has a drawn area in which a projection portion extends in a predetermined direction and in which, when the metal sheet is drawn into the selected component shape by a single step, the material flows toward a position where the projection portion is formed from a direction crossing the predetermined direction in plan view, and the cross section setting unit sets a line portion passing through the drawn area among the set lines as a line along the predetermined direction.

17. The die shape designing device according to claim 14, wherein
the shape determination unit has an adjustment unit configured to adjust a length of the cross-sectional line length for each cross section on a condition that a total sum of the cross-sectional line length for each cross section calculated by the cross-sectional line length calculation unit is not changed for each step from the reference step to the step one before the selection step, and
the shape determination unit determines the die shape based on the cross-sectional line length for each cross section after the adjustment by the adjustment unit.

18. The die shape designing device according to claim 17, wherein the adjustment unit adjusts the cross-sectional line length based on a cross-sectional line length difference between adjacent cross sections.

19. The die shape designing device according to claim 14, wherein
when a number of the plurality of cross sections is defined as n, a subscript identifying each cross section is defined as i ($1 \leq i \leq n$), a line length in the selected component shape is defined as $L_i 1$ and a line length in the reference shape is defined as $L_i 2$, which are cut by the same cross section for each cross section, the uniform elongation of the material is defined as El, a number of the press steps from the reference step to the selection step is defined as m, and a subscript identifying the press step is defined as j ($1 \leq j \leq m$),
an inflow amount ($L_i 3$) of the cross section i calculated by the inflow amount calculation unit is determined by Expression (1) below,
a cross-sectional line length ($L_i 4$) of the cross section i in a j-th step calculated by the cross-sectional line length calculation unit is determined by Expression (2) below,
a coefficient a in Expression (1) sets an elongation degree of the material with respect to the uniform elongation of the material, a coefficient $b_k$ in Expression (2) sets an inflow degree of the material in the j-th step among all of m times of press steps, and the coefficient $b_k$ ($1 \leq k \leq m$) satisfies $\Sigma_{j=1}^{m}(b_k)=1$, $$L_i 3 = L_i 1 - L_i 2 - a \cdot El \quad (1),$$

wherein $0 < a < 1$ is established, $$L_i 4 = L_i 2 + \Sigma_{k=1}^{j}(b_k \cdot L_i 3) \quad (2),$$

wherein $0 \leq b_k \leq 1$ is established.

20. A die used in each step when a pressed component is manufactured by press forming a metal sheet into a final component shape through a plurality of press steps, wherein
when one step is selected from the plurality of press steps and set as a selection step, a component shape obtained in the selection step is set as a selected component shape, one press step selected from the plurality of press steps and carried out before the selection step is set as a reference step, a shape of the metal sheet before press forming in the reference step is set as a reference shape, and the press steps from the reference step to the selection step include a press step having drawing,
for a forming surface of a die used in each step from the reference step to the selection step, the forming surface of the die in the selection step has a shape following the selected component shape,
a line is set, the line being orthogonal to, in plan view, a direction in which a material flows when the metal sheet of the reference shape is drawn into the selected component shape by a single step using the die in the selection step, and a plurality of cross sections is set, the cross sections being individually cut by each of planes orthogonal to the line in plan view and extending in a direction along a sheet thickness direction of the metal sheet before forming,
for each cross section arranged along an extending direction of the set line, each of the cross-sectional shapes cut by the plurality of cross sections in the forming surface of the die in each step is set from an inflow amount of the material set based on a cross-sectional line length of the selected component shape cut by the cross section, a cross-sectional line length in the reference shape cut by a same cross section as the cross section, and a uniform elongation of the material of the metal sheet, and
a number of the plurality of cross sections is defined as n, a subscript identifying each cross section is defined as i ($1 \leq i \leq n$), a line length in the selected component shape is defined as $L_i 1$ and a line length in the reference shape is defined as $L_i 2$, which are cut by the same cross section for each cross section, the uniform elongation of the material is defined as El, a number of the press steps from the reference step to the selection step is defined as m, and a subscript identifying the press step is defined as j ($1 \leq j \leq m$),
for the set inflow amount of the material, an inflow amount ($L_i 3$) of the cross section i is set by Expression (1) below,
a cross-sectional line length ($L_i 4$) of the cross section i in the forming surface of a die used in a j-th step is represented by Expression (2) below, and
a coefficient $b_k$ ($1 \leq k \leq m$) satisfies $\Sigma_{j=1}^{m}(b_k)=1$, $$L_i 3 = L_i 1 - L_i 2 - a \cdot El \quad (1),$$

wherein, $0 < a < 1$ is established, $$L_i 4 = L_i 2 + \Sigma_{k=1}^{j}(b_k \cdot L_i 3) \quad (2),$$

wherein $0 \leq b_k \leq 1$ is established.

21. The die according to claim 20, wherein the selection step is a final press step and the reference step is a first press step.

22. The die according to claim 20, wherein
the selected component shape has a drawn area in which a projection portion extends in a predetermined direction and in which, when the metal sheet is drawn into the selected component shape by a single step, the material flows toward a position where the projection portion is formed from a direction crossing the predetermined direction in plan view, and
a line portion passing through the drawn area among the set lines is set as a line along the predetermined direction.

23. The die according to claim 20, wherein, in the forming surface of the die for each step, a cross-sectional line length difference between adjacent cross sections is equal to or less than a preset value.

* * * * *